United States Patent

Sharp

[15] 3,691,332
[45] Sept. 12, 1972

[54] VACUUM-TYPE ELECTRIC SWITCHGEAR

[72] Inventor: William T. Sharp, Philadelphia, Pa.
[73] Assignee: General Electric Company
[22] Filed: Nov. 10, 1970
[21] Appl. No.: 88,503

[52] U.S. Cl. ............200/144 B, 200/145, 200/50 AA
[51] Int. Cl. .............................................H01h 33/66
[58] Field of Search...............200/144 B, 50 AA, 145

[56] References Cited

UNITED STATES PATENTS

| | | | |
|---|---|---|---|
| 3,397,293 | 8/1968 | Darrow et al. | .........200/144 B |
| 3,527,911 | 9/1970 | Sharp | .....................200/144 B |
| 3,597,556 | 8/1971 | Sharp | .....................200/144 B |
| 3,603,753 | 9/1971 | Frink | ................200/50 AA X |

*Primary Examiner*—Robert S. Macon
*Attorney*—J. Wesley Haubner et al.

[57] ABSTRACT

Discloses a movable circuit breaker unit for polyphase metal-clad switchgear comprising a movable truck including a horizontally-extending base and a vertically-extending frame projecting upwardly from the base. In each phase of the circuit breaker, there are two vacuum interrupters mounted in vertically-spaced, axially aligned relationship on opposite sides of a casing that is supported on said framework by horizontally extending insulating structure. Horizontally extending studs at the outer ends of the two interrupters are supported on the frame by suitable insulators and are electrically connected to the interrupters by flexible braid. The studs project from the vacuum interrupters toward the rear end of the movable circuit breaker unit, and the interrupters are displaced by a substantial distance from the frame toward said rear end.

5 Claims, 2 Drawing Figures

VACUUM-TYPE ELECTRIC SWITCHGEAR

This invention relates to metal-clad switchgear that employs vacuum-type circuit interrupters for interrupting and closing the circuit extending therethrough.

The general type of switchgear that I am concerned with is shown and claimed in U.S. Pat. No. 3,397,293 Darrow et al., assigned to the assignee of the present invention. This switchgear comprises a grounded metal cubicle into which bus bars extend and out of which line conductors extend. For controlling the connection between the bus bars and the line conductors, there is provided a movable circuit breaker unit that can be moved between connected and disconnected positions within the cubicle. The movable circuit breaker unit of the Darrow et al patent comprises a plurality of vacuum-type circuit interrupters, with one interrupter being provided for each phase of the circuit, assuming a three phase a.c. circuit.

The Darrow et al. patent discloses a manner of arranging the interrupters that results in a movable circuit breaker unit that is quite compact so long as only one interrupter is required per phase. But for higher voltage applications, where more than one interrupter per phase is required, a movable circuit breaker constructed as generally disclosed in the Darrow et al. patent consumes an excessive amount of space.

An object of the present invention is to provide a movable circuit breaker unit that comprises a plurality of vacuum interrupters per phase which are so mounted and arranged that the circuit breaker unit can be accommodated in an exceptionally small space without defeating the electrical clearance needed for relatively high voltages, such as 34.5 kV.

Another object is to mount the interrupters and the operating mechanism for the interrupters on a framework of the movable circuit breaker unit in such a way that interrupter operation produces little or no unbalanced external force on the framework.

Still another object is to arrange the interrupters in such a manner as to facilitate cooling thereof by air flow induced by natural convection.

In carrying out my invention in one form, I provide a movable circuit breaker unit for polyphase metal-clad switchgear comprising a truck that is horizontally movable between connected and disconnected positions within said switchgear. The truck comprises a base and a generally vertically-extending frame secured thereto at a location spaced from the rear end of the truck. Two vacuum interrupters are provided for each phase; and means is provided for mounting these interrupters in vertically-spaced relationship to each other with their longitudinal axes extending generally vertically. The mounting means comprises a casing located between the two interrupters and generally horizontally-extending insulating structure projecting from said frame toward the rear end of the truck and having one end secured to said frame and its opposite end secured to said casing. A pair of horizontally-extending studs, supported on the truck by insulators, are located at the outer ends of the interrupters and project therefrom toward the rear end of the truck. Vertically-extending insulating barriers separate the phases to assure electrical isolation therebetween. The interrupters are located in a position between the frame and the rear end of the truck.

For a better understanding of the invention, reference may be had to the following description taken in conjunction with the accompanying drawings, wherein.

Figure 1:
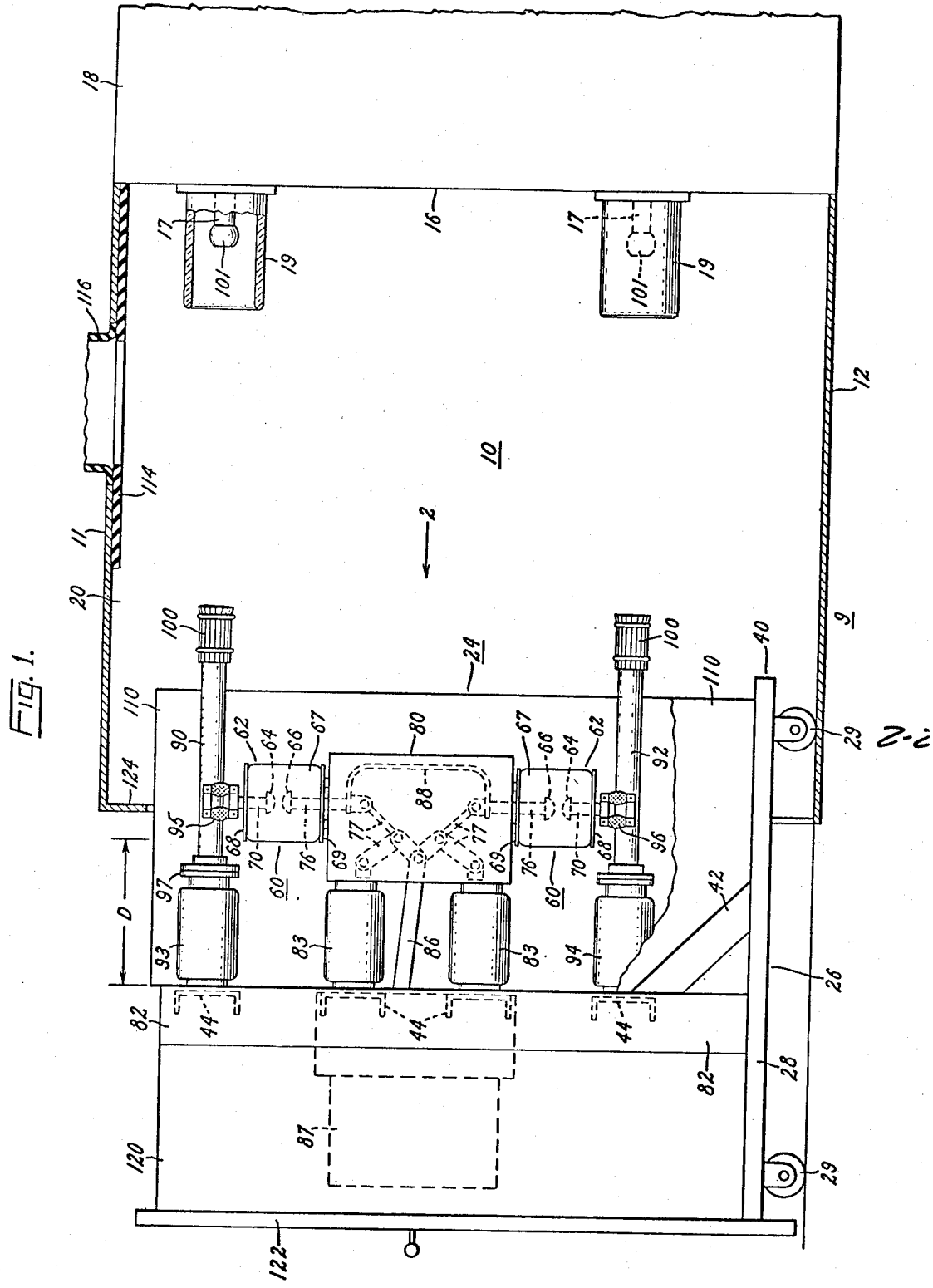
FIG. 1 is a side elevational view, partly in section, showing switchgear embodying one form of the present invention.

Referring now to FIG. 1, the switchgear unit 9 shown therein comprises a grounded metal cubicle 10 having a top wall 11, a bottom wall 12, and a back wall (not shown) at its right hand end. Extending parallel to the back wall is a vertical partition 16. Partition 16 is spaced from the back wall to form a primary conductor compartment 18 between the partition 16 and the backwall.

Located in front of the partition 16 is a circuit breaker compartment 20. This circuit breaker compartment is adapted to receive a horizontally-movable circuit breaker 24. In FIG. 1, the circuit breaker unit 24 is shown partially removed from the cubicle 10. Conventional stationary studs 17 surrounded by suitable insulators 19 project through the partition 16 to provide terminals for electrically connecting the circuit breaker unit 24 to the primary conductors (not shown) behind partition 16.

The movable circuit breaker unit 24 comprises a truck 26 that includes a base 28 mounted on suitable wheels 29. These wheels roll along the bottom wall of the cubicle when the circuit breaker is being withdrawn from or inserted into its connected position within the cubicle.

The truck of the movable circuit breaker unit 24 further comprises a vertically-extending framework 82 that is welded to the base 28 at a position horizontally-spaced from the rear end 40 of the truck. A suitable gusset plate 42 is also welded between the frame 82 and base 28 to provide mechanical reinforcement for the framework. Framework 82 comprises a pair of vertically-extending beams at laterally opposed sides of the base 28 and channels 44 extending horizontally between the beams and welded thereto at vertically spaced locations.

The movable circuit breaker unit 24 further comprises six identical vacuum-type circuit interrupters 60. Two circuit interrupters are provided for each phase of the power circuit. The internal details of the circuit interrupter 60 form no part of the present invention and are therefore shown in schematic form only. For a more specific showing of an interrupter suitable for use in the disclosed circuit breaker, reference may be had to U.S. Pat. No. 3,441,698 Sofianek, assigned to the assignee of the present invention.

Referring to FIG. 1, generally speaking, the circuit interrupter 60 comprises an evacuated and sealed envelope 62 in which a pair of separable butt-type contacts 64 and 66 are mounted. The contacts have been suitably processed to free them of sorbed bases and contaminants that decompose in the presence of an arc to form permanent bases. The envelope 62 comprises a tubular housing 67 of insulating material and a pair of end caps 68 and 69 closing off the ends of the tubular housing and suitably sealed thereto. Referring to the upper interrupter 60, the upper contact 64 is a stationary contact that is supported on the lower end of a stationary conductive rod 70. The conductive rod projects in sealed relationship through the upper end cap 68 of the envelope 62 and is rigidly attached to the end cap 68, as by welding.

The other contact 66 of the circuit interrupter is a movable contact brazed to the upper end of a conductive actuating rod 76, referred to hereinafter as the movable contact rod. This movable contact rod 76 is mounted for substantially straight line movement along its longitudinal axis and projects through an opening in the lower end cap 69. A flexible metal bellows (not shown) is interposed between the lower end cap and the movable contact rod 76 to provide a seal about the contact rod that allows for longitudinal movement thereof without impairing the vacuum inside the envelope 62.

The lower interrupter 60 is identical to the upper interrupter, except that it is inverted, and corresponding reference numerals are used with the two interrupters to designate corresponding parts. FIG. 1 shows how the interrupters 60 in one phase of the circuit breaker are arranged and mounted. It is to be understood that the interrupters in the other two phases of the illustrated circuit breaker are substantially identically arranged and mounted.

The circuit interrupters 60 are shown in FIG. 1 in their open position with their contacts 66 and 64 spaced apart. Closing of the circuit interrupters is effected by driving the movable contact 66 of each interrupter into engagement with its associated stationary contact 64. Opening is effected by driving each movable contact 66 in an opposite direction, i.e., away from its stationary contact. The two interrupters are operated substantially simultaneously during a closing operation or during an opening operation by forces supplied to their movable contact rods 76 through linkages 77 which are connected to a common operating rod 86. An example of suitable linkages for this purpose is disclosed in my joint application Ser. No. 3,457 filed Jan. 16, 1970, now Patent No. 3,597,556, and assigned to the assignee of the present invention. The linkages 77 are located within and supported from a box-like casing 80, preferably of metal, located between the two interrupters 60.

For supporting the two interrupters 60 of each phase, the metal casing 80 is relied upon. The adjacent end caps 69 of the two interrupters 60 are attached to this casing 80 so that the longitudinal axes of the two interrupters extend vertically and in substantial aligned relationship. Casing 80 is, in turn, supported on the rigid steel frame 82 by means of a pair of vertically spaced horizontally extending porcelain insulators 83. The left hand end of each insulator 83 is rigidly attached to the frame 82, and the right hand end is rigidly attached to casing 80.

For operating the interrupters 60 of each phase, a generally horizontally extending operating rod 86 is provided. This operating rod 86 at its right hand end extends into the casing 80 and is coupled to the movable contact rods of the two interrupters by the previously mentioned linkages 77 located within casing 80. Each phase of the circuit breaker has an operating rod substantially identical to the operating rod 86 of FIG. 1.

An operating mechanism 87, common to all three phases, is provided for supplying operating force to the three operating rods 86. This operating mechanism 87 is supported on the vertically extending framework 82 of the truck 26 but on an opposite side of the framework from the interrupter-supporting casings 80. This operating mechanism 87 may be of any suitable conventional form and is therefore shown in schematic block form only. It is important to note, however, that this operating mechanism 87 derives its principal support from frame 82. The operating mechanism effects closing of the interrupters by driving the operating rod 86 to the right from its position of FIG. 1. Opening is effected by driving the operating rod 86 in an opposite direction.

For carrying current between the two interrupters 60 of each phase, flexible conductive braid 88 is provided within the box-like casing 80. As shown in FIG. 1, this conductive braid is electrically connected between the two movable contact rods 76 of the interrupters.

For carrying current to and from the outer ends of interrupters 60, a pair of vertically spaced-apart horizontally extending conductive studs 90 and 92 are provided at the outer ends of the interrupters. These studs 90 and 92 are rigidly supported on the truck 26 by insulators 93 and 94, respectively, located at the left hand end of the studs. Each of these insulators 93 and 94 is secured at its left hand end to framework 82 and at its right hand end to its associated stud. A suitable adapter 97 is used for securing each stud to its supporting insulator. The upper end of the upper interrupter 60 is electrically connected to stud 90 by flexible conductive braid 95, and the lower end of the lower interrupter is electrically connected to stud 92 by flexible conductive braid 96.

The studs 90 and 92 project from the interrupters 60 toward the rear end of truck 26 and carry at their free ends socket-type disconnect contacts 100 for mating with stationary disconnect contacts 101 on the stationary studs 17. The disconnect contacts 100 can be of any suitable form, such as shown and described, for example, in the aforesaid Darrow et al. patent. Each of the studs 90 and 92 is substantially aligned with one of the plug-type stationary disconnect contacts 101. Thus, each of the plug-type disconnect contacts 101 is positioned to enter its associated socket-type disconnect contact 100 when the movable circuit breaker unit is fully inserted. Since the studs 90 and 92 are rigidly connected to the framework 82 and are connected to the interrupters only through flexible braids, any mechanical forces applied to the studs are transmitted substantially completely to the framework 82 and substantially none at all to the interrupters. Thus, when the movable circuit breaker unit is racked into its connected position, substantially all the force developed on the studs 90 and 92 by interengagement of disconnect contacts is transmitted to the framework 82 independently of the interrupters.

For insuring that the three phases of the movable circuit breaker unit will be electrically isolated from each other and from ground, I provide a plurality of vertically-extending insulating barriers 110 of a suitable insulating material. These insulating barriers 110 extend in a vertical direction from the base 28 to a position well above the upper stud 90. The insulating barriers 110 also extend from the framework 82 rearwardly of the truck to a position near the free ends of the studs 90 and 92. Two of these barriers 110 are located between the phases of the circuit breaker to insure electrical isolation between the phases, and two are located at the outer sides of the movable circuit breaker unit to insure electrical isolation between the phases and the adjacent grounded metal cabinet.

There are a number of factors contributing to the compactness of my movable circuit breaker unit. One of these is that the two interrupters of each phase have their longitudinal axes extending vertically and in generally aligned relationship. When a linkage-enclosing casing such as 80 is disposed between the two interrupters, the assembly comprising interrupters 60 and casing 80 is relatively long; and if its longitudinal axis extended horizontally, as in the aforesaid Darrow et al. patent, a substantially greater width would have been required for the movable circuit breaker unit.

Another factor contributing to the compactness of my movable circuit breaker unit is the presence of the insulating barriers between the phases and at the outer sides of the phases. The presence of these barriers enables the electrical clearance distances between these parts at different voltages to be reduced.

Still another factor contributing to compactness is that my insulator-supporting frame 82, which is at ground potential, is located in a position displaced horizontally by a substantial distance D from the region in which the vacuum interrupters are located. Had the insulator-supporting framework been in the same plane as the interrupters, as is the case in the aforesaid Darrow et al. patent, then the movable circuit breaker unit would have required a substantially greater width in order to provide the necessary electrical clearances between the live interrupters and this grounded insulator-supporting frame. Although the grounded base 28 of the truck extends past the framework 82 toward the front end of the movable circuit breaker unit, its is vertically spaced a sufficient distance beneath the interrupters and the other high voltage components to provide adequate electrical isolation. In a preferred form of the invention, a horizontally-extending insulating barrier strip 112 (FIG. 2) is provided just above the base to provide assurance of electrical isolation of the base relative to the high voltage parts. A similar plate of insulation 114 is provided along the inner surface of the top wall 11 to provide assurance against an electrical breakdown between the upper studs 90 and this top wall.

Figure 2:
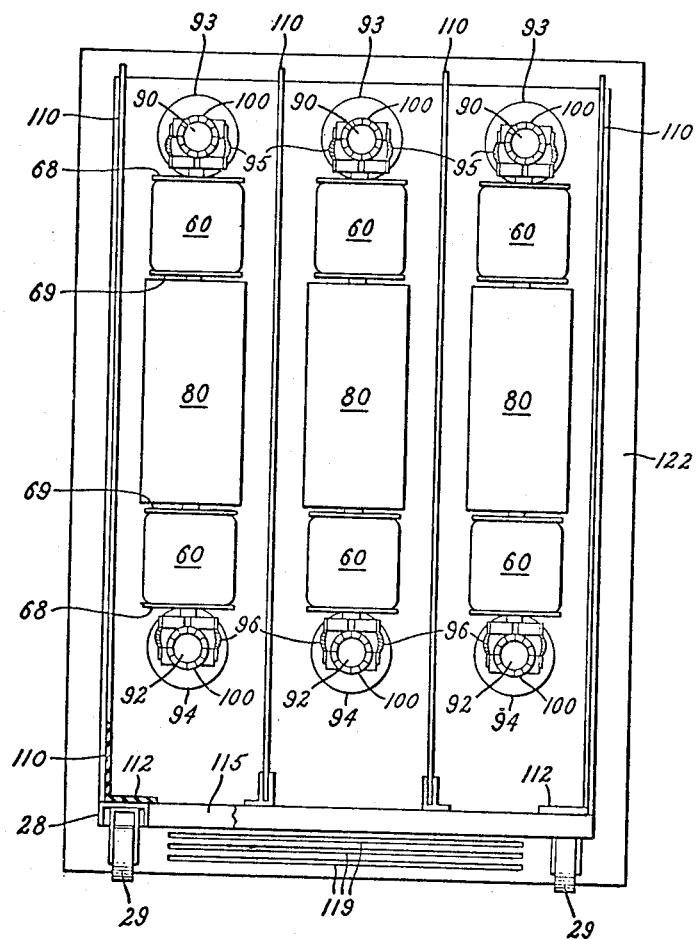
FIG. 2 is an end view, partly in section, of the movable circuit breaker component of FIG. 1 as viewed in the direction of arrow 2 of FIG. 1.

As seen in FIG. 2, the movable circuit breaker unit is open at both its top and its bottom. Note, for example, the opening 115 beneath the left-hand phase of the circuit breaker unit. A similar opening (not shown) is present beneath each of the other phases of the circuit breaker unit. These openings permit cooling air, motivated by natural convection, to rise freely through the spaces between the insulating barriers 110, exiting through the open top of the circuit breaker unit 24, and passing out of the switchgear unit through a vent 116 at its top aligned with these spaces. A suitable inlet 119 for this air is provided in the lower portion of front panel 122. The insulating barriers because of their spaced-apart vertical disposition form the walls of three chimneys, one for each phase of the circuit breaker. The vertically extending disposition of the interrupters enables the barriers to extend vertically, thus enabling them to serve as such chimneys for cooling air for the interrupters and the associated current-carrying parts. Since considerable heat is generated by the high currents which flow through the interrupters, this cooling effect of the air rising between the vertical barriers is important in preventing overheating.

For enclosing the operating mechanism 87, a metal enclosure 120 is suitably attached to the frame 82 and the base 28. This enclosure 120 includes a front panel 122 that is positioned flush with the front wall 124 of the cubicle 10 when the movable circuit breaker unit is fully inserted.

While I have shown and described a particular embodiment of the invention, it will be obvious to those skilled in the art that various changes and modifications can be made made without departing from the invention in its broader aspects, and I therefore intend in the appended claims to cover all such changes and modifications as fall within the true spirit and scope of the invention.

What I claim as new and desire to secure by Letters Patent of the United States is:

1. A movable circuit breaker unit for polyphase metal-clad switchgear comprising:
   a. a truck that is horizontally movable between connected and disconnected positions within said switchgear,
   b. said truck comprising a generally horizontally extending base and a generally vertically extending frame rigidly secured to said base at a location spaced from the rear end of said truck,
   c. two vacuum-type interrupters for each phase of said switchgear, each interrupter comprising a tubular housing at least partially of insulating material and conducting means comprising separable contacts forming a conductive path through said tubular housing when the interrupter is closed,
   d. means for mounting said two interrupters of each phase in vertically spaced relationship with respect to each other, with the longitudinal axes of said tubular housings extending generally vertically, comprising:
      i. a casing located between said two interrupters,
      ii. means for securing said interrupter housings to said casing, and
      iii. generally horizontally extending insulating structure having one end secured to said frame and its opposite end secured to said casing, said insulating structure projecting from said frame in a direction toward the rear end of said truck,
   e. a pair of generally horizontally extending studs for each phase respectively located at the ends of said interrupter housings remote from said casing and projecting from said housing toward the rear end of said truck,
   f. insulating means for supporting said studs on said truck,
   g. horizontally- spaced vertical insulating barriers projecting from said frame toward the rear end of said truck and interposed between said phases to assure electrical isolation between said phases, h. said interrupters being located in a position between said frame and said rear end of said truck.

2. A movable circuit breaker unit as defined in claim 1 and further comprising additional vertical insulating barriers projecting from said frame toward the rear end of said truck at the outer sides of the outer of said phases for assuring electrical isolation between said outer phases and any adjacent grounded structure.

3. A movable circuit breaker unit as defined in claim 1 in which the insulating means for supporting said studs comprises an insulator mounted between said vertically extending frame and said upper stud and in which flexible conductive means is provided for electrically connecting said interrupters to said studs, whereby mechanical forces applied to said studs are transmitted to said truck substantially independently of said interrupters.

4. A movable circuit breaker unit as defined in claim 1 and further comprising:
   a. an operating mechanism for said interrupters mounted on said frame on the opposite side thereof from the location of said interrupters,
   b. an insulating operating rod for each phase extending between said operating mechanism and the interior of said casing of the associated phase, and
   c. linkage means within said casing for mechanically connecting said operating rod to one of the contacts of each of said interrupters of the associate phase.

5. A movable circuit breaker unit as defined in claim 1 in which the interrupters of each phase are located in chimney-like, vertically extending passages, each having at least one wall defined by one of said barriers, the movable circuit breaker unit being open at both its top and bottom opposite said passages, whereby air may flow freely into and out of said passages to effect cooling of said interrupters.

* * * * *